(12) United States Patent
Jain et al.

(10) Patent No.: US 12,579,213 B2
(45) Date of Patent: Mar. 17, 2026

(54) BIAS SCALING FOR N-BIT CONSTRAINED HARDWARE ACCELERATION

(71) Applicant: Texas Instruments Incorporated, Dallas, TX (US)

(72) Inventors: Anshu Jain, Bangalore (IN); Manu Mathew, Bangalore (IN); Kumar Desappan, Bangalore (IN); Anand Anil Pathak, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1128 days.

(21) Appl. No.: 17/528,472

(22) Filed: Nov. 17, 2021

(65) Prior Publication Data

US 2022/0164411 A1     May 26, 2022

(30) Foreign Application Priority Data

Nov. 18, 2020    (IN) .............................. 202041050213

(51) Int. Cl.
| | |
|---|---|
| *G06F 17/15* | (2006.01) |
| *G06F 7/544* | (2006.01) |
| *G06F 17/16* | (2006.01) |
| *G06N 3/04* | (2023.01) |

(52) U.S. Cl.
CPC ............ *G06F 17/15* (2013.01); *G06F 7/5443* (2013.01); *G06F 17/16* (2013.01); *G06N 3/04* (2013.01)

(58) Field of Classification Search
CPC ........ G06F 17/15; G06F 17/16; G06F 7/5443; G06N 3/04
See application file for complete search history.

(56) References Cited

U.S. PATENT DOCUMENTS

| | | | |
|---|---|---|---|
| 2016/0358069 A1* | 12/2016 | Brothers ................. | G06F 7/764 |
| 2017/0286830 A1* | 10/2017 | El-Yaniv ............... | G06N 3/045 |
| 2020/0193270 A1* | 6/2020 | Wu ........................ | G06N 3/082 |

* cited by examiner

*Primary Examiner* — Michael D. Yaary
(74) *Attorney, Agent, or Firm* — Michael T. Gabrik; Frank D. Cimino

(57) ABSTRACT

In described examples, an integrated circuit includes a memory storing weights and biases, an N-bit fixed point matrix operations accelerator, and a processor. Starting with a first convolution layer, a convolution layer modeled using the processor receives input feature values. A feature scale and weight scale are reduced if an accumulator scale is greater than a maximum bias scale. The input feature values are rescaled using the feature scale, the weights are quantized using the weight scale, and the biases are quantized using the feature scale and weight scale. The rescaled input feature values and quantized weights and biases are convolved using the N-bit fixed point matrix operations accelerator to generate output feature values. The process repeats from the receive action using the output feature values as the input feature values of the next convolution layer. The process then repeats for all layers, feeding back an output feature range.

24 Claims, 7 Drawing Sheets

500

| | WEIGHT (w) 502 | | | FEATURE (f) 510 | | | BIAS (b) 518 | | | RESULT (r) 526 | | | |
|---|---|---|---|---|---|---|---|---|---|---|---|---|---|
| | w_real 504 | w_scale 506 | w_fixpt 508 | f_real 512 | f_scale 514 | f_fixpt 516 | b_real 520 | b_scale 522 | b_fixpt 524 | r_fixpt = w_fixpt * r_fixpt + b_fixpt 528 | r_scale = b_scale = w_scale + f_scale 530 | expected r_real = w_real * f_real + b_real 532 | actual r_real = r_fixpt / r_scale 534 |
| NO BIAS SATURATION 536 | 16.0 | 8 | 128 | 4.0 | 16 | 64 | 32.0 | 128 | 4096 | 12288 | 128 | 96.0 | 96.0 |
| BIAS SATURATION 538 | 16.0 | 8 | 128 | 4.0 | 16 | 64 | 1200.0 | 128 | 65535 | 73727 | 128 | 1264.0 | 576.0 |
| RESCALED 540 | 16.0 | 4 | 64 | 4.0 | 8 | 32 | 1200.0 | 32 | 38400 | 40448 | 32 | 1264.0 | 1264.0 |

FIG. 5

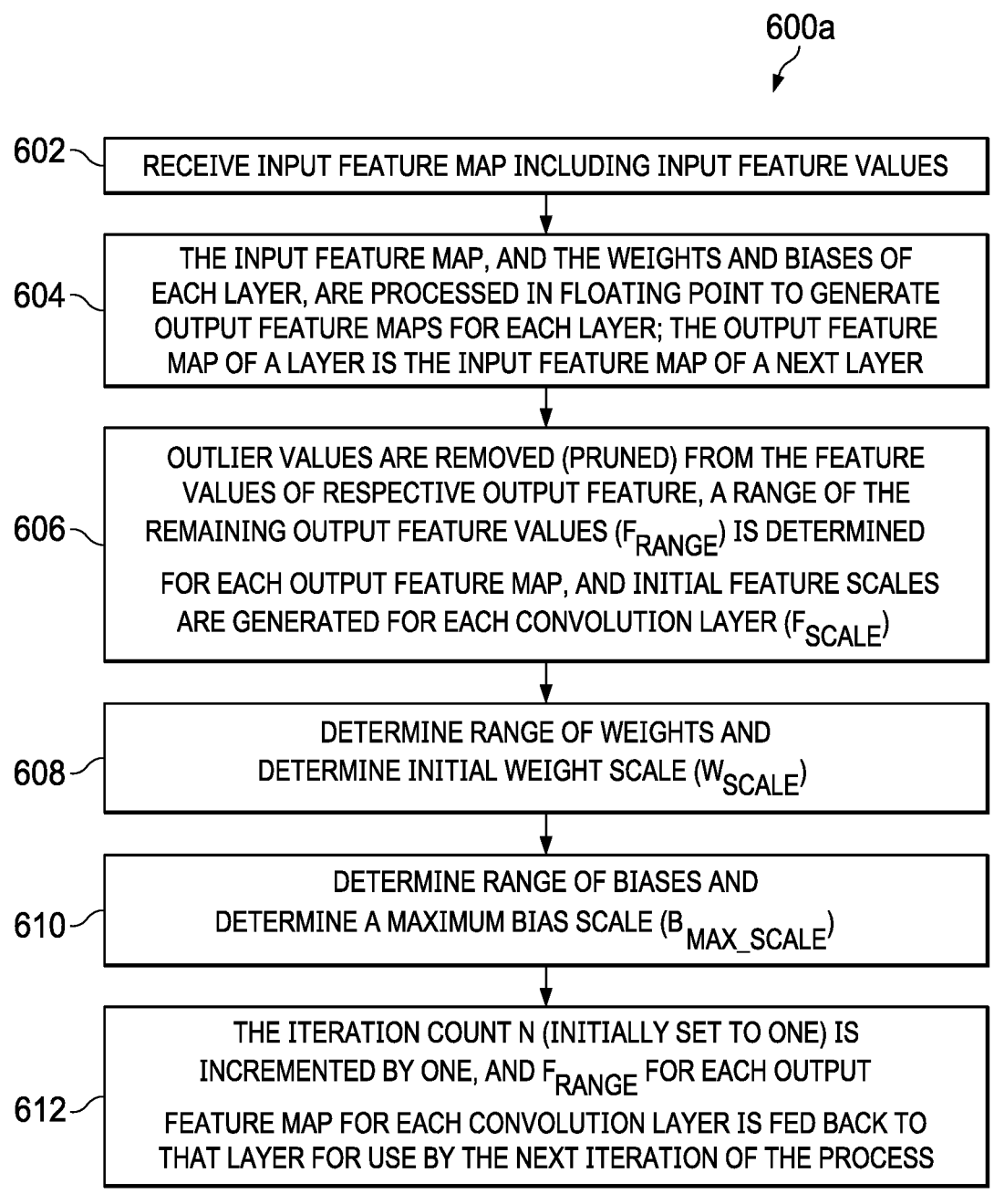

600a

602 — RECEIVE INPUT FEATURE MAP INCLUDING INPUT FEATURE VALUES

604 — THE INPUT FEATURE MAP, AND THE WEIGHTS AND BIASES OF EACH LAYER, ARE PROCESSED IN FLOATING POINT TO GENERATE OUTPUT FEATURE MAPS FOR EACH LAYER; THE OUTPUT FEATURE MAP OF A LAYER IS THE INPUT FEATURE MAP OF A NEXT LAYER

606 — OUTLIER VALUES ARE REMOVED (PRUNED) FROM THE FEATURE VALUES OF RESPECTIVE OUTPUT FEATURE, A RANGE OF THE REMAINING OUTPUT FEATURE VALUES ($F_{RANGE}$) IS DETERMINED FOR EACH OUTPUT FEATURE MAP, AND INITIAL FEATURE SCALES ARE GENERATED FOR EACH CONVOLUTION LAYER ($F_{SCALE}$)

608 — DETERMINE RANGE OF WEIGHTS AND DETERMINE INITIAL WEIGHT SCALE ($W_{SCALE}$)

610 — DETERMINE RANGE OF BIASES AND DETERMINE A MAXIMUM BIAS SCALE ($B_{MAX\_SCALE}$)

612 — THE ITERATION COUNT N (INITIALLY SET TO ONE) IS INCREMENTED BY ONE, AND $F_{RANGE}$ FOR EACH OUTPUT FEATURE MAP FOR EACH CONVOLUTION LAYER IS FED BACK TO THAT LAYER FOR USE BY THE NEXT ITERATION OF THE PROCESS

FROM FIG. 6B

A

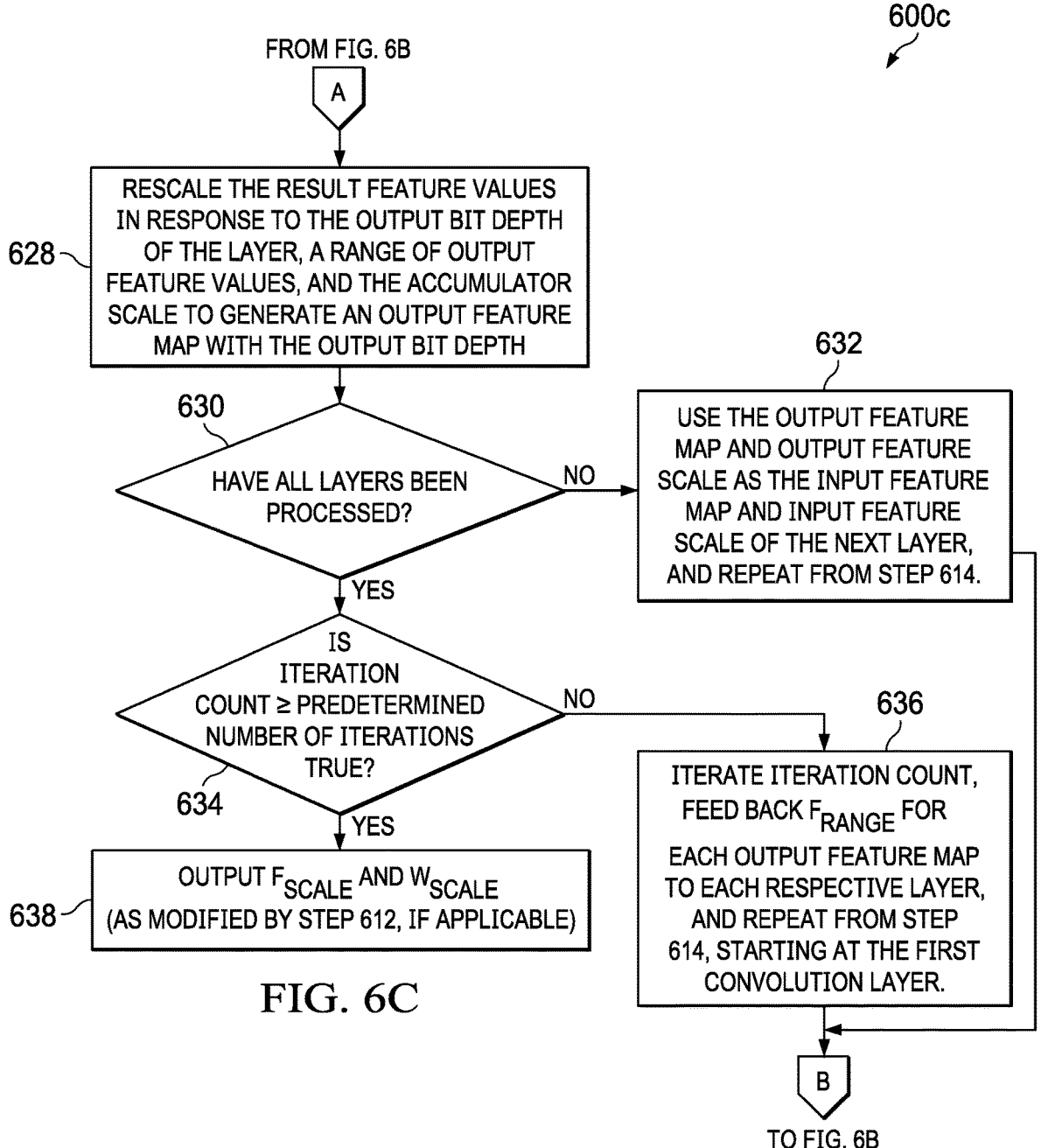

628 — RESCALE THE RESULT FEATURE VALUES IN RESPONSE TO THE OUTPUT BIT DEPTH OF THE LAYER, A RANGE OF OUTPUT FEATURE VALUES, AND THE ACCUMULATOR SCALE TO GENERATE AN OUTPUT FEATURE MAP WITH THE OUTPUT BIT DEPTH

630

HAVE ALL LAYERS BEEN PROCESSED?

NO

632

USE THE OUTPUT FEATURE MAP AND OUTPUT FEATURE SCALE AS THE INPUT FEATURE MAP AND INPUT FEATURE SCALE OF THE NEXT LAYER, AND REPEAT FROM STEP 614.

YES

IS ITERATION COUNT ≥ PREDETERMINED NUMBER OF ITERATIONS TRUE?

634

NO

636

ITERATE ITERATION COUNT, FEED BACK $F_{RANGE}$ FOR EACH OUTPUT FEATURE MAP TO EACH RESPECTIVE LAYER, AND REPEAT FROM STEP 614, STARTING AT THE FIRST CONVOLUTION LAYER.

YES

638 — OUTPUT $F_{SCALE}$ AND $W_{SCALE}$ (AS MODIFIED BY STEP 612, IF APPLICABLE)

BIAS SCALING FOR N-BIT CONSTRAINED HARDWARE ACCELERATION

CROSS-REFERENCE TO RELATED APPLICATION

This application claims the benefit of and priority to India Patent Application No. 202041050213, filed Nov. 18, 2020, which is incorporated herein by reference.

TECHNICAL FIELD

This application relates generally to fixed point convolution, and more particularly to use of N-bit constrained hardware acceleration for fixed point convolution.

BACKGROUND

Deep learning is a class of machine learning algorithms used for tasks such as recognizing features in raw input image data. Image data can include, for example, camera pixel data, electron backscatter data, or radar or light detection and ranging (LIDAR) sensor data. Resulting feature and object recognition can be used to support security systems, automated robotics, self-driving vehicles, watermark recognition, inventory management, semiconductor manufacturing, and other imaging-sensitive applications. Deep learning techniques include convolutional neural networks and transformers.

SUMMARY

In described examples, an integrated circuit includes a memory storing weights and biases, an N-bit fixed point matrix operations accelerator, and a processor. Starting with a first convolution layer, a convolution layer modeled using the processor receives input feature values. A feature scale and weight scale are reduced if an accumulator scale is greater than a maximum bias scale. The input feature values are rescaled using the feature scale, the weights are quantized using the weight scale, and the biases are quantized using the feature scale and weight scale. The rescaled input feature values and quantized weights and biases are convolved using the N-bit fixed point matrix operations accelerator to generate output feature values. The process repeats from the receive action using the output feature values as the input feature values of the next convolution layer. The process then repeats for all layers, feeding back an output feature range.

BRIEF DESCRIPTION OF THE DRAWINGS

FIG. 5 shows a table of example inputs and results for quantization and convolution.

FIG. 6A shows an example $n^{th}$ iteration of a process for hardware-accelerated convolution using the image recognition system of FIG. 1, for n=1.

FIG. 6C shows an example $n^{th}$ iteration of a process for hardware-accelerated convolution using the image recognition system of FIG. 1, for n≥2, continuing from FIG. 6B.

DETAILED DESCRIPTION

Some example deep learning models, such as convolutional neural networks (CNN), can be efficiently implemented using matrix multiplication to process layers. For example, CNNs use matrix multiplication to sequentially process input data tensors (called feature maps, which include feature values) in serially connected convolutional layers using sets of weights and biases; different sets of weights and biases correspond to different convolutional layers. (Serially connected layers can also include non-convolutional layers.) This process can be accelerated using hardware specifically designed to efficiently perform matrix multiplication operations. Limiting matrix multiplication hardware to fixed point operations with selected limited bit depth is particularly efficient. Accordingly, scaling is used to convert floating point weights and biases to fixed point to enable use of N-bit fixed point matrix multiplication acceleration hardware, where N is an integer. However, the scale applied to bias values should be the same as the product of the scale applied to feature values and the scale applied to weight values. Feature and weight scales that are too large can cause "bias saturation," which refers to an overflow caused by using a scale that is too large to convert a bias from floating point to fixed point without exceeding the available bit depth. Bias saturation causes accuracy loss.

Feature scale and weight scale values are interdependent. Changes to feature scales and weight scales in a convolution layer affect weight scales and output feature maps in later (convolutional and non-convolutional) layers in the network, because output feature maps of the convolution layer propagate through subsequent convolution layers and corresponding input and output feature maps. Accordingly, an iterative approach is used, in which initial feature scale values and initial weight scale values in respective convolution layers of a deep learning model are refined towards stable values over the course of multiple iterations. The feature scales and weight scales generated by a final iteration are used during inference performed by the deep learning model on real-world (as opposed to pre-defined for test) captured data.

Figure 1:
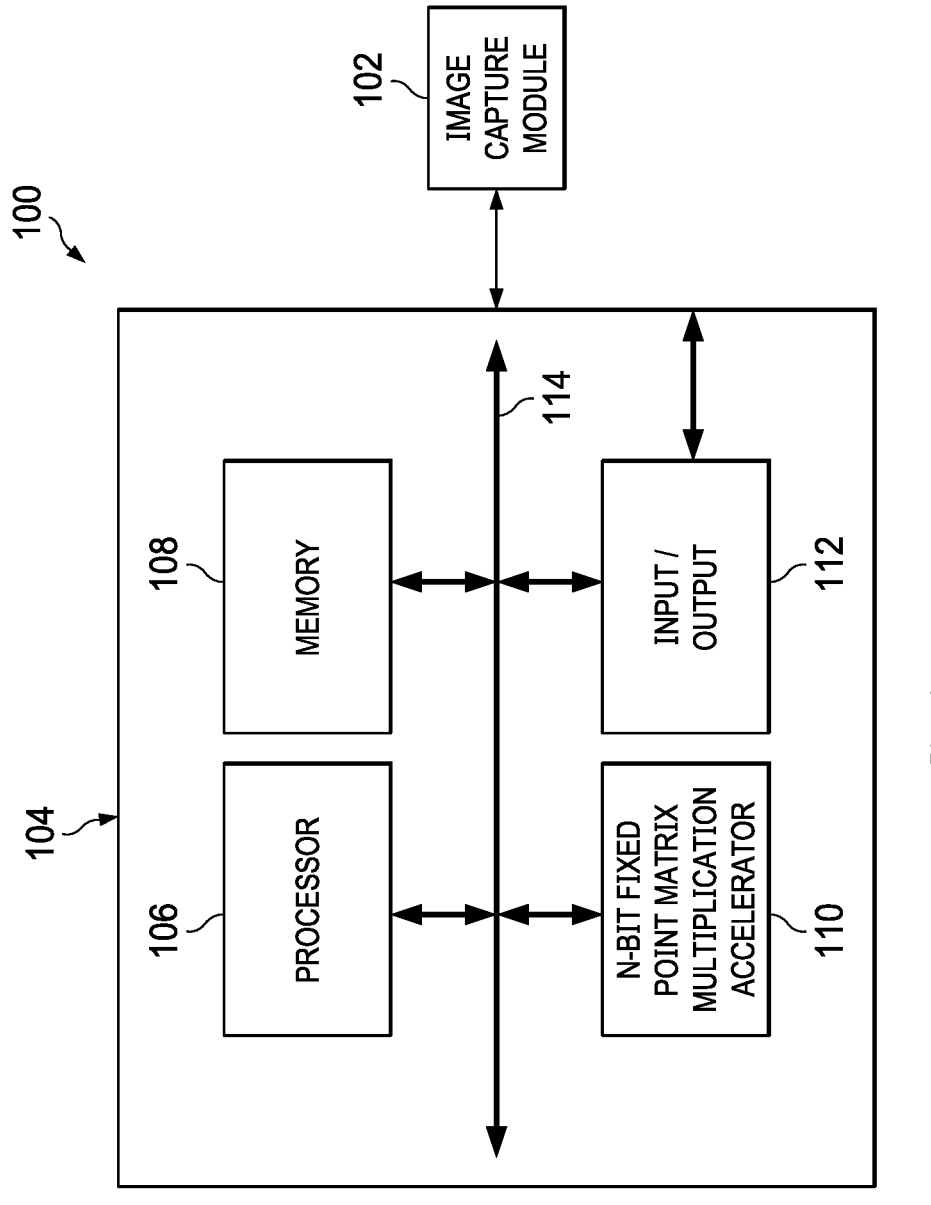
FIG. 1 shows a block diagram of an example image recognition system.

FIG. 1 shows a block diagram of an example image recognition system 100. An image capture module 102 is connected to output to, and to be controlled by, an image processing integrated circuit (IC) 104. The image processing IC 104 includes a processor 106, a memory 108, an N-bit fixed point matrix multiplication accelerator 110 (where N is an integer), and an input/output (I/O) block 112 that are connected to communicate with each other via a bus 114.

The processor 106 transmits control signals to the image capture module 102 via the I/O block 112. In response, the image capture module 102 uses photons, electrons, ions, gaseous or liquid medium pressure waves, or other particles or waves to capture environmental image data. The image capture module 102 transmits this raw image data to the image processing IC 104, which receives the data using the I/O block 112 and stores the data in the memory 108 for processing. Data is processed by the processor 106 and the N-bit fixed point matrix multiplication accelerator 110. Operation of the N-bit fixed point matrix multiplication accelerator 110 is described with respect to FIGS. 2 through 4. The N-bit fixed point matrix multiplication accelerator 110 is, for example, an eight bit (8 bit) fixed point multiply-accumulate (MAC) accelerator 110.

Figures 2, 3:
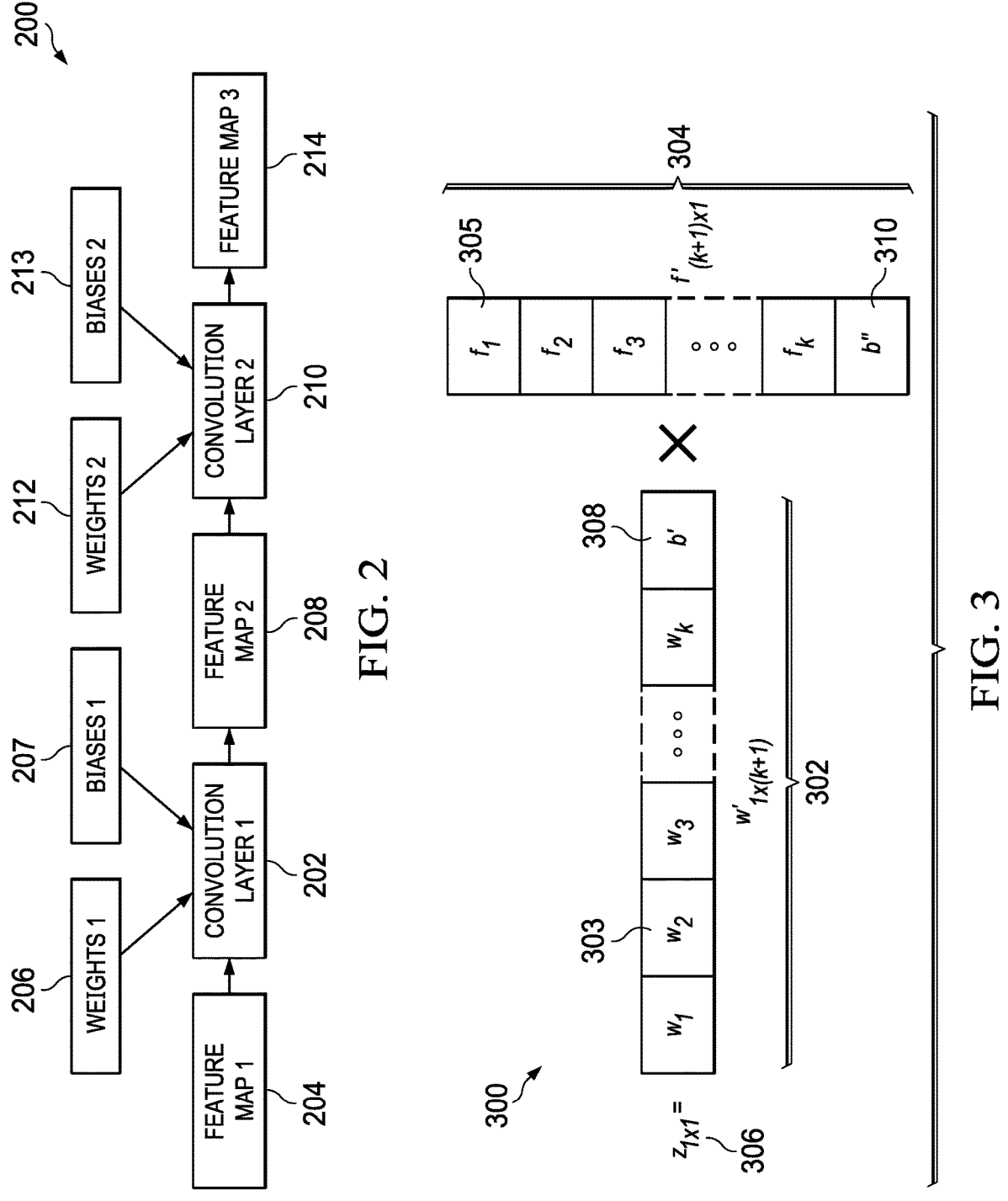
FIG. 2 shows a block diagram of an example convolutional neural network.
FIG. 3 shows a diagram of multiplication of example bias-extended weight and feature vectors.

FIG. 2 shows a block diagram of an example CNN 200. A first convolution layer (convolution layer 1) 202 receives a tensor comprising input data, which is image data, captured by the image capture module 102. The input data tensor comprises a first feature map (feature map 1) 204. Image data is captured and processed as fixed point data. For example, image data values can be captured so that individual values have a range of zero to 255, corresponding to eight bit unsigned integers. Convolution layer 1 202 also receives a first set of trained weights (weights 1) 206 and a first set of trained biases (biases 1) 207. Weights and biases are trained and stored as floating point values. Weights 1 206 and biases 1 207 are shared across the input space of convolution layer 1 202 and are used by convolution layer 1 202 to process feature map 1 204. Weights and biases are determined by, for example, training the CNN 200 using a test input data set. Convolution layer 1 202 performs convolution on feature map 1 204, using weights 1 206 and biases 1 207, to generate a second feature map (feature map 2) 208. Convolution is performed using matrix operations, as described below with respect to FIGS. 3 and 4.

Feature map 2 208, which is an output tensor of convolution layer 1 202, is an input tensor for a second convolution layer (convolution layer 2) 210. Convolution layer 2 210 also receives a second set of weights (weights 2) 212 and a second set of biases (biases 2 213). Convolution layer 2 210 performs matrix operations on feature map 2 208, using weights 2 212 and biases 2 213, to generate a feature map 3 114 (an output tensor of convolution layer 2 210). A variable number of convolution layers and other layers can be used in the CNN 200. Additional layers and operations can be used in a CNN, such as pooling layers, a non-linear activation function (such as tanh, the sigmoid function, or the rectified linear unit (ReLu) function), and input and output layers (not shown).

FIG. 3 shows a diagram 300 illustrating a dot product of an example bias-extended weights vector (w') 302 with a bias-extended feature vector (f') 304. The first bias component term (b') 308 extends a vector including the weights values 303 to form the bias-extended weights vector (w') 302. The bias-extended weights vector (w') 302 includes individual weights values 303 $w_1$, $w_2$, $w_3$, . . . , and $w_k$. The bias-extended feature vector (f') 304 includes individual feature values 305 $f_1$, $f_2$, $f_3$, . . . , and $f_k$, and is extended by the second bias component term (b"). The dot product of the bias-extended weights vector (w') 302 with the bias-extended feature vector (f') 304 produces an output (z) 306 (a multiplication sign is used instead of a dot product symbol in FIGS. 3 and 4 for visual clarity). Equivalently, the output (z) 306 equals the dot product of a vector comprising the weights values 303 with a vector comprising the feature values 305, plus the product of the first and second bias component terms 308 and 310 (b'×b").

A CNN convolution operation can be represented as a dot product of a weights vector (w) of dimensions 1×k with a feature vector (f) of dimensions k×1, followed by addition of a bias term (b) of dimensions 1×1, to produce an output (z) of dimensions 1×1, as shown in Equation 1:

$$z_{1\times1}=w_{1\times k}\cdot f_{k\times1}+b_{1\times1}$$ 
<div align="right">Equation 1</div>

Equation 1 can be rearranged so that it can be implemented solely using MAC operations of the form $a_n=a_{n-1}+b\times c$, where $a_n$ accumulates the result of a number $n^{th}$ MAC operation in a series of MAC operations. The bias term $b_{1\times1}$ can be split into a product of two components, $b'_{1\times1}\times b''_{1\times1}$. In this product, the first bias component, $b'_{1\times1}$, corresponds to the first bias component term (b') 308, and the second bias component, $b''_{1\times1}$, corresponds to the second bias component term (b") 310. This enables Equation 1 to be rewritten as Equation 2:

$$z_{1\times1}=w_{1\times k}\cdot f_{k\times1}+b'_{1\times1}\times b''_{1\times1}$$ 
<div align="right">Equation 2</div>

Equation 2 limits the bit depth of the bias term (the product of the two bias component terms) to the sum of the bit depths of the weight values and of the feature values. For example, if the weight values and feature values each have bit depth of eight bits, then the bias term has bit depth less than or equal to sixteen bits. Equation 3 incorporates the separated bias terms 308 and 310 of Equation 2 into the weights vector (w) and the feature vector (f) to form a bias-extended weights vector (w') 302 of dimensions 1×(k+1), and a bias-extended features vector (f') 304 of dimensions (k+1)×1:

$$z_{1\times1}=w'_{1\times(k+1)}\cdot f'_{(k+1)\times1}$$ 
<div align="right">Equation 3</div>

Convolution as shown in Equation 3 is repeated over the two- or three-dimensional feature planes, corresponding to two- or three-dimensional image data input, to generate (respectively) two- or three-dimensional feature plane output. Rearranging Equation 1 to produce Equation 3 enables matrix multiplication used to perform the CNN convolution operation without requiring a separate operation to add bias, as further described with respect to FIG. 4. Accordingly, MAC operations can be used to apply Equation 3 to the input features and the trained weights and biases. Equation 3 also enables CNN convolution operations to be performed using specialized system on chip (SoC) hardware designed to accelerate fixed point MAC operations, so that CNN results can be obtained using less power, faster, and with a smaller IC area cost. Fixed point operations can be computed more efficiently—accordingly, faster, using similar-design hardware—than floating point operations.

Figure 4:
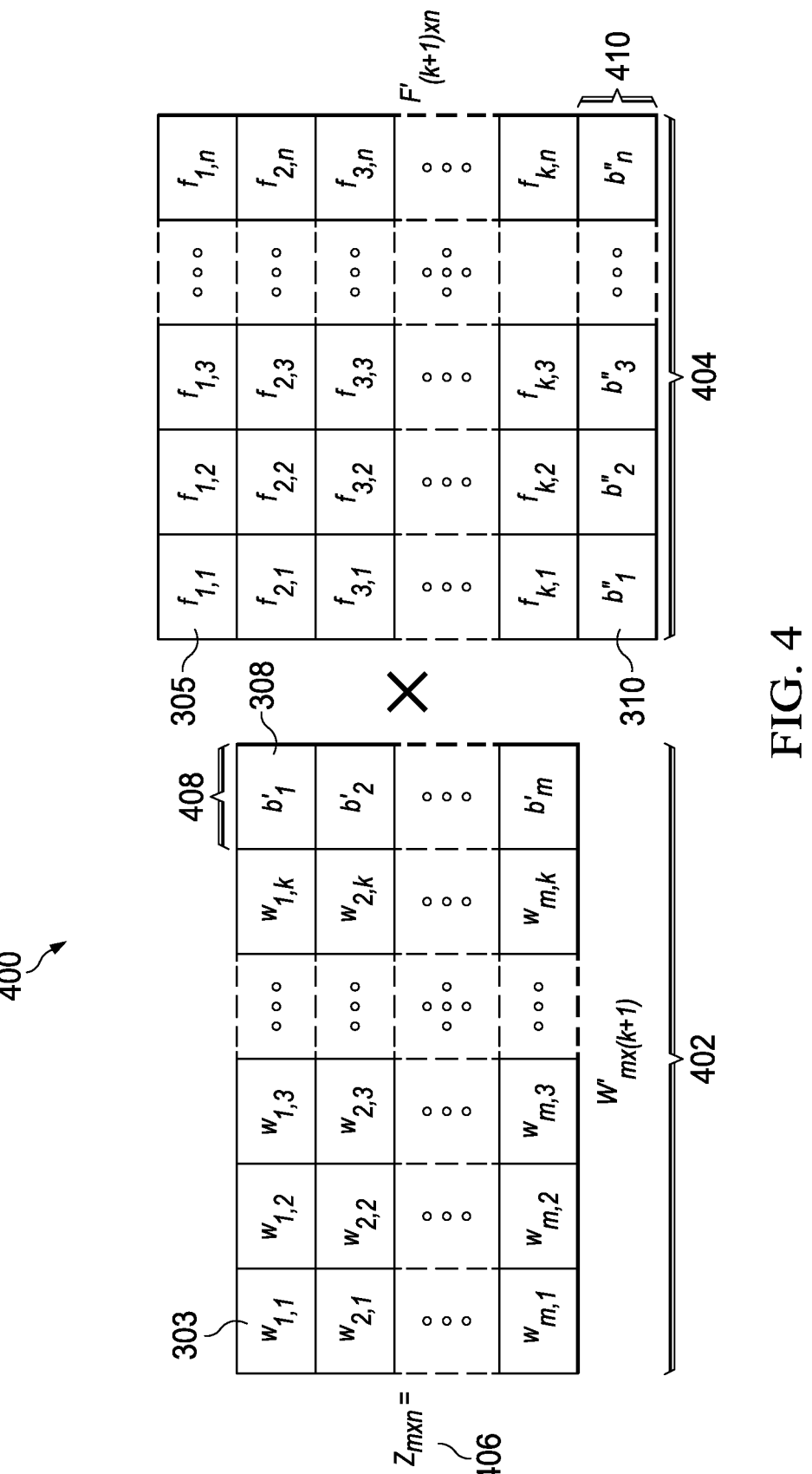
FIG. 4 shows a diagram of multiplication of example bias-extended weight and feature matrices.

FIG. 4 shows a diagram 400 illustrating matrix multiplication of an example bias-extended weights matrix 402 and an example bias-extended feature matrix 404. The bias-extended weights matrix (W') 402 includes m sets (or rows) of individual weights values 303 $w_1$, $w_2$, $w_3$, . . . , and $w_k$. The bias-extended feature matrix (F') 404 includes n sets (or columns) of individual feature values 405 $f_1$, $f_2$, $f_3$, . . . , and $f_k$. The matrix multiplication product of the bias-extended weights matrix (W') 402 with the bias-extended feature matrix (F') 404 produces an output matrix (Z) 406. A first bias component vector (B') 408 including m individual first bias component terms 308 $b'_1$, $b'_2$, $b'_3$, . . . , and $b'_m$ is appended on a side of the bias-extended weights matrix (W') 402. A second bias component vector (B") 410 including n individual second bias components terms 310 $b''_1$, $b''_2$, $b''_3$, . . . , and $b''_n$ is appended on a side of the bias-extended feature matrix (F') 304. This matrix multiplication can be expressed as shown in Equation 4:

$$Z_{m\times n}=W'_{m\times(k+1)}\times F'_{(k+1)\times n}$$ 
<div align="right">Equation 4</div>

The bias-extended weights matrix (W') 402 is multiplied by the bias-extended feature matrix (F') 404 by applying Equation 3 to each combination of a row of the bias-extended weights matrix (W') 402 and a column of the bias-extended feature matrix (F') 404. Accordingly, for example, a second row, third column entry (which can be referred to as cell (2, 3)) of the output matrix (Z) 406 corresponds to the dot product of the second row of the bias-extended weights matrix (W') 402 with the third column of the bias-extended feature matrix (F') 404.

FIG. 5 shows a table 500 of example inputs and outputs for quantization and convolution. Data is captured by the image capture module 102 and passed between CNN layers (such as convolution layer 1 202 and convolution layer 2 210) in floating point, in which some or all binary digits correspond to fractional values. However, some hardware for accelerating convolution operations, such as the N-bit fixed point MAC accelerator 110, is enhanced to perform fixed point operations, in which binary numbers corresponds to integer values limited by the bit depth N of the N-bit fixed point MAC accelerator 110. Fixed point operations use less power than floating point operations and are useful in enabling image processing (and other applications) using CNNs on low power embedded devices. Accordingly, floating point values are quantized to support accelerated convolution operations. Quantizing converts a floating point value to a corresponding N-bit fixed point value by multiplying the floating point value by a scale. Eight bit fixed point calculations are more efficient, and accordingly can be performed faster, than sixteen bit fixed point calculations (assuming hardware of similar design). Input values in the table of FIG. 5 are described as limited by eight bit acceleration hardware, resulting in sixteen bit result values (an eight bit number multiplied by an eight bit number produces a sixteen bit number). Fixed point weight and feature values in FIG. 5 are eight bit unsigned integers. Fixed point bias values in FIG. 5 are sixteen bit unsigned integers. (In some examples, fixed point weight and feature values are signed. Examples described herein use unsigned values for clarity and simplicity.)

Referring to FIG. 5, weight-related values are grouped together under the heading weight (w) 502 (the letter w is used to identify values related to a weight). The columns in the weight group 502 include a floating point weight (w_real) 504 column, a weight scale (w_scale) 506 column, and a fixed point weight (w_fixpt) 508 column. The w_real 504 column corresponds to a floating point weight value, such as a value included in weights 1 206. The w_scale 506 column corresponds to a scale by which the w_real 504 value is multiplied to quantize the w_real 504 value. Quantizing a floating point value results in a larger number, with a greater portion of the value included in an integer component, and a smaller portion of the value included in a fractional component, than was the case in the floating point value. The fractional component is truncated (eliminated) to produce a resulting quantized fixed point value w_fixpt 508. The quantized fixed point value w_fixpt 508 can then be used in convolution operations performed by the 8 bit fixed point MAC accelerator 110. The product of w_real 504 and w_scale 506 produces a resulting w_fixpt 508 with integer value up to 65535, the maximum unsigned fixed point value expressible using sixteen unsigned fixed point result bits in an 8 bit fixed point MAC accelerator 110. The larger the scale, the smaller the remaining fractional component that is truncated. Accordingly, smaller scale decreases the accuracy of final results, and larger scale increases the accuracy of final results.

The columns in the feature (f) group 510 include a floating point feature (f_real) 512 column, a feature scale (f_scale) 514 column, and a fixed point feature (f_fixpt) 516 column. The f_real 512 column corresponds to a floating point feature value, such as a value included in feature map 1 204. The f_scale 514 column corresponds to a scale by which the f_real 512 value is multiplied to quantize the f_real 512 value. The product of f_real 512 and f_scale 514 produces a resulting f_fixpt 508 with integer value up to 65535.

The columns in the bias (b) group 518 include a floating point bias (b_real) 520 column, a bias scale (b_scale) 522 column, and a fixed point bias (b_fixpt) 524 column. The b_real 520 column corresponds to a floating point bias value, such as a value included in biases 1 207. The b_scale 522 column corresponds to a scale the b_real 520 value is multiplied by to quantize the b_real 520 value. As described above, b_scale=w_scale×f_scale. The product of b_real 520 and b_scale 522 produces a resulting b_fixpt 524 with integer value up to 65535.

The columns in the result (r) group 526 include a fixed point result (r_fixpt) 528 column, a result scale (r_scale) 530 column, an expected floating point results (expected r_real) 532 column, and an actual floating point results (actual r_real) 534 column. These values are determined, respectively, as shown in Equations 5, 6, 7, and 8:

$$r\_fixpt = w\_fixpt \times f\_fixpt + b\_fixpt \qquad \text{Equation 5}$$

$$r\_scale = b\_scale = w\_scale \times f\_scale \qquad \text{Equation 6}$$

$$expected\ r\_real = w\_real \times f\_real + b\_real \qquad \text{Equation 7}$$

$$actual\ r\_real = r\_fixpt / r\_scale \qquad \text{Equation 8}$$

The table of FIG. 5 includes three rows, each of which corresponds to a different circumstance based on whether bias saturation occurs. A first, no bias saturation row 536 includes weight, feature, and bias values 502, 510, and 518 that do not lead to bias saturation. Table cell values, and bias saturation, are further described below in light of Equations 9 and 10. A second, bias saturation row 538 includes weight, feature, and bias values 502, 510, and 518 that result in bias saturation. A third, rescaled row 540 includes weight, feature, and bias values 502, 510, and 518 that correspond to values from the bias saturation row 538 that have been rescaled. The values in the rescaled row 540 are rescaled to avoid bias saturation. Individual entries in the table 500 will be described after a description of bias saturation.

Bias saturation will be described in the context of explaining how and why scaling works. Separating the bias vectors from the bias-extended weights and feature matrices 402 and 404, Equation 4 can be equivalently expressed as shown in Equation 9:

$$Z_{m \times n} = W_{m \times k} \times F_{k \times n} + B_{m \times n} \qquad \text{Equation 9}$$

In Equation 9, each of the matrices is expressed in floating point, so that individual values in the weights matrix W and the feature matrix F correspond to individual w_real 504 and f_real 512 values, respectively. ($W_{m \times k} \times F_{k \times n}$ can be referred to as the accumulator, and $B_{m \times n}$ can be referred to as the bias term.) Equation 9 helps to illustrate that the bias scale (b_scale 522) equals the product of the weight scale (w_scale 506) and the feature scale (f_scale 514). Also, the weight scale can be different from the feature scale. These statements are true because rescaling is performed as multiplying both sides of Equation 9 by w_scale×f_scale. This is illustrated by Equation 10:

$$Z_{m \times n} \times w\_scale \times f\_scale = (W_{m \times k} \times w\_scale) \times (F_{k \times n} \times f\_scale) + B_{m \times n} \times (w\_scale \times f\_scale) \qquad \text{Equation 10}$$

Accordingly, for fixed point computation, in order to generate the correct output the scale of the accumulator ($W_{m \times k} \times F_{k \times n}$) is the same as the scale of the bias term ($B_{m \times n}$) so that the two terms can be added. Typically, quantization also includes some truncation of fractional values post-scaling, resulting in precision loss and deviation from ideal results.

For example, if you want to use integer math to get an answer to 0.5×0.5+0.75, you can multiply by four, so that the problem becomes 1×1+3=4 ((0.5×2)×(0.5×2)+(0.75×4)), and then divide by four to get the correct answer to the original problem, one. However, if you only multiply 0.5× 0.5 by four, there is no simple (with respect to the complexity of the original problem) way to rescale the resulting 1.75 to produce the correct answer. The different terms of the problem should be scaled using the same scalar values to efficiently produce an accurate result. (In the context of a CNN, accuracy is with respect to and in the context of the design of the CNN.)

Bias saturation occurs when a floating point bias value multiplied by the bias scale is greater than a maximum fixed point value that can be represented in N bits. (This can also be thought of as the accumulator scale being greater than a maximum scale of the bias term.) Accordingly, bias saturation corresponds to quantization operations with resulting fixed point bias values greater than the bit depth allowed by the N-bit fixed point matrix multiplication accelerator 110. These fixed point bias values are stored as the maximum fixed point value that can be represented in N bits. This results in an accuracy loss within a layer, which is then propagated to and can be compounded by resulting accuracy losses in later layers of the CNN. Accurate bias values enable increased accuracy in deep learning models. Incorrect (for example, saturated quantized) bias values can result in accuracy degradation of CNNs and other deep learning models.

Individual entries in the table 500 will now be described on a row-by-row basis. In the no bias saturation row 536, the w_real 504 value 16.0 multiplied by the w_scale 506 value 8 gives the w_fixpt 508 value 128. The f_real 512 value 4.0 multiplied by the f_scale 514 value 16 gives the f_fixpt 516 value 64. The w_scale 506 value 8 multiplied by the f_scale 514 value 16 gives the b_scale 522 value 128, which is equal to the r_scale 530 value 128. The b_real 520 value 32.0 multiplied by the b_scale 522 value 128 gives the b_fixpt 524 value 4096. Accordingly, the w_fixpt 508 value 128 multiplied by the f_fixpt 516 value 64, plus the b_fixpt 524 value 4096, gives the r_fixpt 528 value 12288. The w_real 504 value 16.0 multiplied by the f_real 512 value 4.0, plus the b_real 520 value 32.0, gives the expected r_real 532 value 96.0. This matches the actual r_real 534 value 96.0, which equals the r_fixpt 528 value 12288 divided by the r_scale 530 value 128.

In the bias saturation row 538, the w_real 504, w_scale 506, w_fixpt 508, f_real 512, f_scale 514, f_fixpt 516, b_scale 522, and r_scale 530 values are the same as in the no bias saturation row 536. However, the b_real 520 value of 1200.0 is larger than in the no bias saturation row 536. The b_real 520 value 1200.00 multiplied by the b_scale 522 value 128 equals 153600, which exceeds the N-bit (in this example, N=8) limit at $2^8-1=65535$, so instead the b_fixpt 524 value is set to that limit of 65535—less than half the correct value. Accordingly, the bias is saturated (similar to a calculator overflow error); the b_scale 522 value is too large to accommodate the range of floating point bias values (for example, biases 1 207) sampled to provide the b_real 520 value. This error propagates through further calculations. The w_fixpt 508 value 128 multiplied by the f_fixpt 516 value 64, plus the b_fixpt 524 value 65535, gives the r_fixpt 528 value 73727. The expected r_real 532 value 1264.0 equals the w_real 504 value 16.0 multiplied by the f_real 512 value 4.0, plus the b_real 520 value 1200.0. The r_fixpt 528 value 73727 divided by the r_scale 530 value 128 gives the r_real 534 value 576.0, evidencing an error resulting from the bias saturation.

In the rescaled row 540, the w_real 504, w_fixpt 508, f_real 512, f_fixpt 516, b_real 520, and b_fixpt 524 values are the same as in the bias saturation row 538. In an example embodiment, the w_scale 506, f_scale 514, b_scale 522, and r_scale 530 values are adjusted in the rescaled row 540. This adjustment is made in light of the product of the b_real 520 and b_scale 522 values in the bias saturation row 538 (153600) being between two and four times the capped b_fixpt 524 value in the bias saturation row 538 (65535). Accordingly, w scale 506 and f_scale 514 are each reduced by a factor of two to avoid bias saturation (153600/4<65535<153600/2), improving precision with respect to the bias saturation result. As previously described, smaller scale values correspond to lower precision of floating point values quantized into fixed point form, and larger scale values correspond to higher precision of floating point values quantized into fixed point form. Also, when working with a data set including numbers of varying precision, the less precise numbers within the data set limit the accuracy of the result. Though reducing scale values reduces precision, the precision loss will generally be less than the precision loss from bias saturation. Further, alternating scale reduction between feature scale and weight scale helps to avoid accuracy loss beyond what is needed to prevent bias saturation.

Scale reduction is computed in the processor 106 prior to performing fixed point calculations in the 8 bit fixed point MAC accelerator 110. After scales are reduced (if appropriate) to avoid bias saturation, the corresponding features (data), weights, and biases are quantized to convert them from floating point type to fixed point type. The resulting fixed point values are provided to the 8 bit fixed point MAC accelerator 110 to perform fixed point MAC calculations using Equation 5.

Figure 6B:
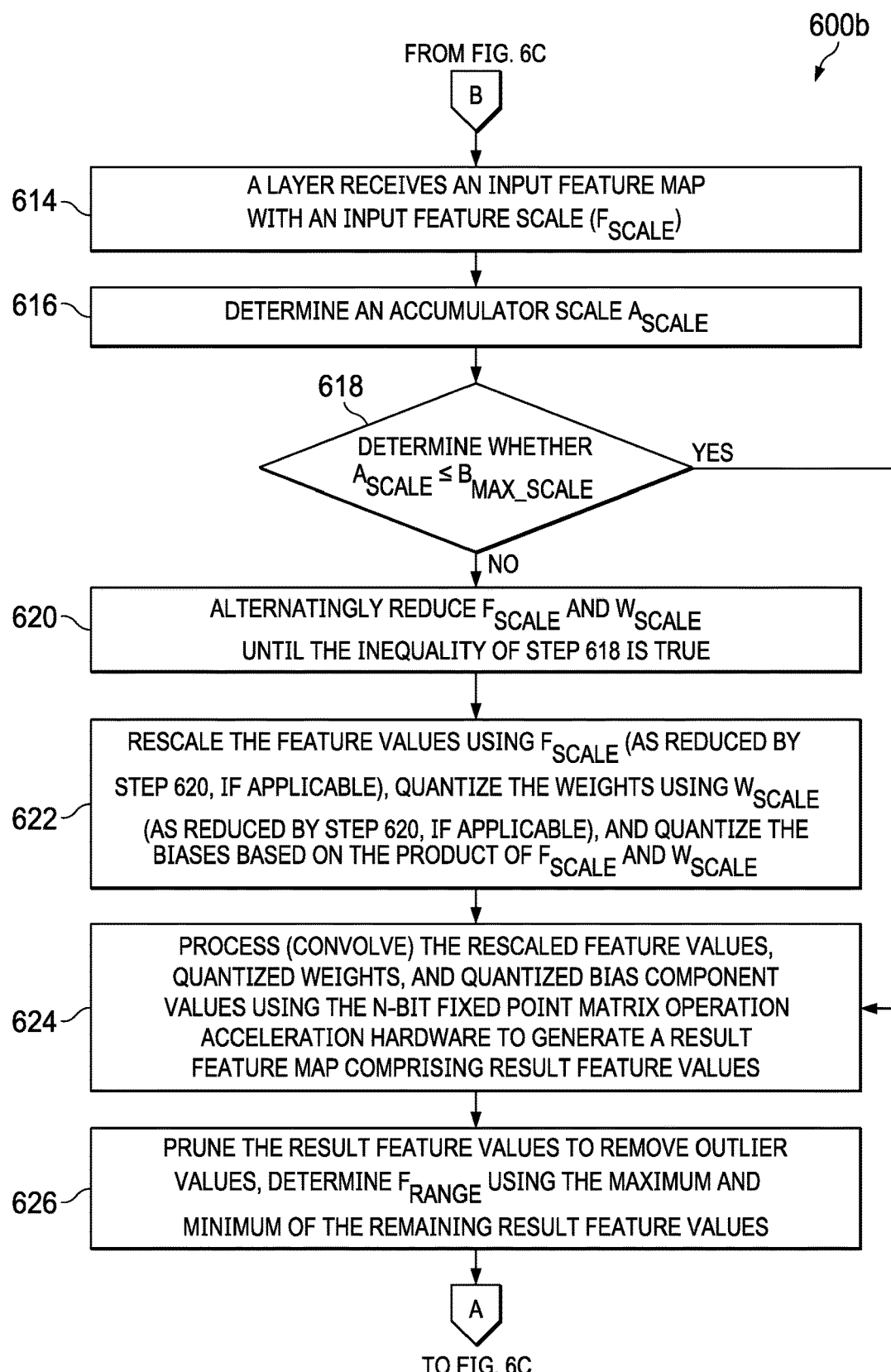
FIG. 6B shows an example $n^{th}$ iteration of a process for hardware-accelerated convolution using the image recognition system of FIG. 1, for n≥2.

FIG. 6A shows an example $n^{th}$ iteration of a process 600a for hardware-accelerated convolution using the image recognition system of FIG. 1, for n=1. FIG. 6B shows an example $n^{th}$ iteration of a process 600b for hardware-accelerated convolution using the image recognition system of FIG. 1, for n≥2. FIG. 6C shows an example $n^{th}$ iteration of a process 600c for hardware-accelerated convolution using the image recognition system of FIG. 1, for n≥2, continuing from FIG. 6B. (The process 600 is split into three figures, corresponding to a first portion of the process 600a and a second portion of the process 600b and 600c, for clarity.) The integer n is an iteration count of the process 600, and is initially set to one. FIGS. 6A, 6B, and 6C are described with respect to unsigned integers. (Slight modifications can be used for signed integers.) In step 602, initial inputs are received by a first convolution layer, comprising an input feature map corresponding to calibration image data and including input feature values. Because image data is initially collected in fixed point, the input feature map received by the first convolution layer initially has a default feature scale. This default feature scale can depend on, for example, pre-processing or normalization performed on captured image data. In step 604, the input feature map, and the weights and biases of each layer, are processed by the processor 106 in floating point using Equations 3, 4, and 5, as described above, to generate output feature maps; the output feature map of a layer is the input feature map of a next layer.

In step 606, outlier values are removed (pruned) from the feature values of respective output feature maps (for example, using histogram clipping), a range of the remaining output feature values ($F_{RANGE}$) is determined for each output feature map, and initial feature scales are generated for each convolution layer ($F_{SCALE}$); the $F_{SCALE}$ generated using $F_{RANGE}$ of an output feature map for a layer is the initial $F_{SCALE}$ for that layer. $F_{RANGE}$ (a floating point value) equals the greater of the absolute value of a maximum feature value and the absolute value of a minimum feature value; for unsigned integer feature values, this equals the maximum feature value. $F_{SCALE}$ is generated as shown in Equation 11, in which N1 is a bit depth of the feature values in the feature map:

$$F_{SCALE} = (2^{N1} - 1)/F_{RANGE} \qquad \text{Equation 11}$$

In step 608, a range of the weights for each convolution layer is determined ($W_{RANGE}$). $W_{RANGE}$ equals the greater of the absolute value of a maximum weight and the absolute value of a minimum weight; for unsigned integer weights, this equals the maximum weight. An initial weight scale ($W_{SCALE}$) for each respective convolution layer is determined as shown in Equation 12, in which N2 is a bit depth of the weights for the respective convolution layer:

$$W_{SCALE} = (2^{N2} - 1)/W_{RANGE} \qquad \text{Equation 12}$$

In step 610, a range of the biases for each convolution layer is determined ($B_{RANGE}$). $B_{RANGE}$ equals the greater of the absolute value of a maximum bias and the absolute value of a minimum bias; for unsigned integer biases, this equals the maximum bias. A maximum bias scale ($B_{MAX\_SCALE}$) for each respective convolution layer is determined as shown in Equation 13, in which N3 equals a maximum output bit depth of an N-bit matrix operation acceleration hardware:

$$B_{MAX\_SCALE} = (2^{N3} - 1)/B_{RANGE} \qquad \text{Equation 13}$$

$B_{MAX\_SCALE}$ is a maximum bias scale because multiplying floating point bias values within the set of biases by a higher scale value would result in bias saturation; accordingly, more than N3 bits would be required to accurately represent bias values quantized by a higher scale value. (For signed integers, $B_{MAX\_SCALE} = (2^{(N3-1)} - 1)/B_{RANGE}$. $B_{RANGE}$ for signed integers is determined similarly to $F_{RANGE}$ for signed integers.) In step 612, the iteration count n (initially set to one) is incremented by one, and $F_{RANGE}$ for each output feature map for each convolution layer is fed back to that layer for use by the next iteration of the process 600, proceeding with step 614.

Turning to FIGS. 6B and 6C (starting with FIG. 6B), in step 614, starting with the first convolution layer, a layer receives an input feature map with an input feature scale ($F_{SCALE}$). An integer L is a number of bits needed to express the accumulator. L is given by Equation 14, where $F_{RANGE}$ is the feature value range fed back (from a layer to itself) from the previous (n–1) iteration, $F_{SCALE}$ is the scale of the input feature map, and $W_{SCALE}$ comes from step 608:

$$L = \log_2 F_{RANGE} \times F_{SCALE} \times W_{SCALE}, \text{ rounded up} \qquad \text{Equation 14}$$

Step 616 determines an accumulator scale $A_{SCALE}$ based on L and on an integer M output bit depth of the convolution layer. The output bit depth of a layer is determined by properties of the layer (for example, some layers may require that output values be sixteen bit signed integers; other layers may require that output values be eight bit unsigned integers). Accordingly, $A_{SCALE}$ is given by Equation 15:

$$A_{SCALE} = F_{SCALE} \times W_{SCALE}/2^{L-M} \qquad \text{Equation 15}$$

Step 618 determines whether $A_{SCALE} \leq B_{MAX\_SCALE}$. If the answer is yes, then the process 600 skips to step 622. If the answer is no (the accumulator scale is greater than the maximum bias scale), the process 600 proceeds at step 620. In step 620, $F_{SCALE}$ and $W_{SCALE}$ are alternatingly reduced by half (updated) until the inequality of step 618 is true, thereby passing the process 600 to step 622. In step 622, the feature values are rescaled using $F_{SCALE}$ (as reduced by step 620, if applicable), the weights are quantized using $W_{SCALE}$ (as reduced by step 620, if applicable), and the biases are quantized based on the product of $F_{SCALE}$ and $W_{SCALE}$. The quantized biases are separated into bias component values for use in convolution. In step 624, the rescaled feature values, quantized weights, and quantized bias component values are processed by the N-bit fixed point matrix operation acceleration hardware 110 using Equations 3, 4, and 5, as described above, to generate a result feature map comprising result feature values.

In step 626, the result feature values are pruned to remove outlier values (for example, using histogram clipping), and $F_{RANGE}$ (a floating point value) is determined using the (floating point) maximum and minimum of the remaining result feature values (as described above). In step 628 (in FIG. 6C), the result feature values are rescaled in response to the output bit depth of the layer to generate an output feature map. Step 628 uses L (the number of bits needed to express the result feature values) determined according to Equation 14, where $F_{RANGE}$ is the range of the result feature values, $F_{SCALE}$ is the scale of the input feature map (as reduced by step 620, if applicable), and $W_{SCALE}$ comes from step 608 (as reduced by step 620, if applicable). Step 628 applies a rightward shift of L–M bits to each of the result feature values of the result feature map to generate an output feature map, and generates the output feature scale (the output accumulator scale) as $F_{SCALE} \times W_{SCALE}/2^{L-M}$ (see Equation 15). This change generates an output feature map with the output bit depth.

Step 630 determines whether all layers of the deep learning model have been processed. If all layers have been processed, then the process 600 proceeds to step 634. Otherwise, in step 632, the process 600 is repeated from step 614 (in FIG. 6B) for the next convolution layer, using the output feature map and the output feature scale of the just-processed layer as the input feature map and the input feature scale of the next convolution layer. (Note that the output feature scale may be further adjusted according to steps 618 and 620 prior to use of the output feature map for further convolution.) Step 634 determines whether a predetermined number of iterations of steps 614 through 632 have already been performed (iteration count≥number of iterations?). If so, the process 600 proceeds to step 638. If not, the iteration count is incremented in step 636, and the process 600 returns to step 614, feeding back the range of the feature values of the output feature map ($F_{RANGE}$). In step 638, the process 600 outputs an $F_{SCALE}$ and a $W_{SCALE}$ for each convolution layer for use by the respective layers in processing real-world feature maps.

Modifications are possible in the described embodiments, and other embodiments are possible, within the scope of the claims.

In some examples, N is sixteen, thirty two, or another power of two.

In some examples, N is an integer other than a power of two.

In some examples, the N-bit fixed point matrix multiplication accelerator performs only fixed point operations.

In some examples, $F_{SCALE}$, $W_{SCALE}$, and $B_{SCALE}$ equal powers of two. In some examples, one or more of $F_{SCALE}$, $W_{SCALE}$, or $B_{SCALE}$ does not equal a power of two.

In some examples, input data other than image data is used, such as captured sound data; for example, to perform natural language processing.

In some examples, a deep learning model other than a convolutional neural network is used, such as a transformer.

In some examples, methods and systems described herein are applied to deep learning model layers other than or in addition to convolutional layers, such as de-convolutional layers and inner product layers.

In some examples, a process being performed with respect to a layer refers to the process being performed using weights and biases of the layer, including when operational control of the process remains with a previous layer.

In some examples, the feature scale post-step 628 for the first convolution layer for an $i^{th}$ iteration of the process 600 is used as the input feature scale for the first convolution layer for an $(i+1)^{th}$ iteration of the process 600.

In some examples, $F_{RANGE}$ can determined and maintained in fixed point or floating point. In some examples, it is more convenient to maintain $F_{RANGE}$ and certain other values, such as maximum feature value and minimum feature value, in floating point, and to multiply by $F_{SCALE}$ to convert to fixed point as needed.

In some examples, if the output feature scale is greater than the maximum bias scale, the input feature scale (as reduced by step 620, if applicable) and the weight scale (as reduced by step 620, if applicable) are alternatingly reduced (for example, divided by two), and the output feature scale is re-determined, until the output feature scale is less than or equal to the maximum bias scale. If the output feature scale is reduced, the feature values of the output feature map are rescaled accordingly.

In some examples, updated feature scales or updated weight scales are fed back from layers to themselves from iteration to iteration.

What is claimed is:

1. An integrated circuit, comprising:
an interface to couple to a memory, the memory configured to store image data obtained via the interface, and store a set of weights and a set of biases corresponding to each of multiple convolution layers of a deep learning model;
an N-bit fixed point matrix operations hardware accelerator, for an integer N, coupled to the interface; and
a processor coupled to the processor via the interface, in which the N-bit fixed point matrix operations hardware accelerator and the processor are configured to:
in a first iteration:
a) receive an initial feature map based on the image data, the initial feature map including a first set of feature values, with a corresponding initial feature scale, using a first convolution layer of the deep learning model;
b) process the initial feature map, the set of weights, and the set of biases using floating point operations to determine a feedback feature range for each of the convolution layers;
starting with the first convolution layer, in an nth iteration, for n≥2:
c) determine an accumulator scale in response to the initial feature scale, the initial weight scale, the feedback feature range, and an output bit depth of the layer;

d) if the accumulator scale is greater than a maximum bias scale, alternatingly reduce the initial feature scale and the initial weight scale until the product is less than or equal to the maximum bias scale, wherein an updated feature scale is the reduced initial feature scale if the initial feature scale was reduced and otherwise is the initial feature scale, and wherein an updated weight scale is the reduced initial weight scale if the initial weight scale was reduced and otherwise is the initial weight scale;
e) convolve the feature map, the set of weights, and the set of biases to generate an output feature map, the convolve action using the updated feature scale and the updated weight scale to generate rescaled or quantized values, the convolve action using the N-bit fixed point matrix operations hardware accelerator to perform matrix operations on the rescaled or quantized values; and
f) determine an output feature range of feature values of the output feature map, and determine an output feature scale of the output feature map in response to the output feature range;
wherein the initial feature map, the set of weights, the initial weight scale, the set of biases, and the maximum bias scale in steps c) through f) are the initial feature map, the set of weights, the initial weight scale, the set of biases, and the maximum bias scale corresponding to a layer being processed by a respective iteration of steps c) through f).

2. The integrated circuit of claim 1,
wherein at least one of the processor and the N-bit fixed point matrix operations hardware accelerator splits the quantized biases into paired quantized bias components prior to step f); and
wherein convolving the rescaled first set of feature values with the quantized weights and the quantized biases convolves the rescaled first set of feature values with the quantized weights and the quantized paired bias components.

3. The integrated circuit of claim 1, wherein at least one of the processor and the N-bit fixed point matrix operations hardware accelerator is configured to process multiply-accumulate operations.

4. The integrated circuit of claim 1, wherein the initial feature map is fixed point, and the set of weights and the set of biases are each floating point.

5. The integrated circuit of claim 1, wherein the deep learning model is a convolutional neural network.

6. The integrated circuit of claim 1, wherein at least one of the processor and the N-bit fixed point matrix operations hardware accelerator is configured to, in an nth iteration, for n≥2:
g) repeat steps c) through f) for a next convolution layer of the deep learning model, using the output feature map and the output feature scale as the initial feature map and initial feature scale, respectively, of the next convolution layer, until all layers of the model have been processed; and
h) repeat steps c) through g), starting over at the first convolution layer of the deep learning model, using the output feature range determined in an (n−1) th iteration as the feedback feature range in an $n^{th}$ iteration, where n≥3.

7. The integrated circuit of claim 6, wherein at least one of the processor and the N-bit fixed point matrix operations hardware accelerator is configured to, prior to step d), for each convolution layer of the deep learning model, determine the maximum bias $\leq (2^N-1)$ scale for unsigned bias values so that $$\text{maximum bias scale} \leq \frac{2^{N-1}-1}{\begin{array}{c}\text{(maximum of absolute value of}\\ \text{maximum bias value and absolute}\\ \text{value of minimum bias value)}\end{array}}.$$

8. The integrated circuit of claim 6,
wherein at least one of the processor and the N-bit fixed point matrix operations hardware accelerator is configured to determine the initial feature scale for the first convolution layer for a first iteration of steps c) through f) for unsigned feature values so that feature scale $\leq$ $(2^P-1)$/maximum feature value, or for signed feature values so that $$\text{feature scale} \leq \frac{2^{P-1}-1}{\begin{array}{c}\text{maximum of (absolute value}\\ \text{of maximum feature value and}\\ \text{absolute value of minimum feature value)}\end{array}};$$

wherein at least one of the processor and the N-bit fixed point matrix operations hardware accelerator is configured to, prior to step c), for each convolution layer of the deep learning model, determine the initial weight scale for unsigned weights so that weights scale $\leq (2^Q-1)$/maximum weight, or for signed weights so that $$\text{weights scale} \leq \frac{2^Q-1}{\begin{array}{c}\text{maximum of}\\ \text{(absolute value of maximum weight}\\ \text{and absolute value of minimum weight)}\end{array}};$$

and
wherein P is a bit depth of the feature values, Q is a bit depth of the weights, and P+Q≤N.

9. The integrated circuit of claim 8, wherein at least one of the processor and the N-bit fixed point matrix operations hardware accelerator is configured to, prior to determining the initial feature scale, prune outlier feature values.

10. The integrated circuit of claim 6, wherein at least one of the processor and the N-bit fixed point matrix operations hardware accelerator is configured to perform the repeat action of step h) a number M times, wherein M is responsive to a stability of the updated feature scales and the updated weight scales between iterations of step h).

11. The integrated circuit of claim 6, wherein at least one of the processor and the N-bit fixed point matrix operations hardware accelerator is configured to use the updated feature scale for the first convolution layer for an ith iteration of steps c) through g) for the first convolution layer as the initial feature scale for the first convolution layer for an $(i+1)^{th}$ iteration of steps c) through g).

12. The integrated circuit of claim 1, wherein the captured image data includes one or more of camera pixel data, radar data, and LIDAR data.

13. A process comprising:
starting with a first convolution layer of the deep learning model, in a first iteration, using an N-bit fixed matrix operations hardware accelerator and a processor:

a) receiving an initial feature map based on externally-obtained image data, the initial feature map including a first set of feature values, with a corresponding initial feature scale;
b) process the initial feature map, the set of weights, and a set of biases using floating point operations to determine a feedback feature range for each of the convolution layers;
starting with the first convolution layer, in an nth iteration, for n≥2:
c) determine an accumulator scale in response to the initial feature scale, the initial weight scale, the feedback feature range, and an output bit depth of the layer;
d) if the accumulator scale is greater than a maximum bias scale, alternatingly reducing the initial feature scale and the initial weight scale until the product is less than or equal to the maximum bias scale, wherein an updated feature scale is the reduced initial feature scale if the initial feature scale was reduced and otherwise is the initial feature scale, and wherein an updated weight scale is the reduced initial weight scale if the initial weight scale was reduced and otherwise is the initial weight scale;
e) convolving the feature map, the set of weights, and the set of biases to generate an output feature map, the convolving using the updated feature scale and the updated weight scale to generate rescaled or quantized values, the convolving using the N-bit fixed point matrix operations hardware accelerator to perform matrix operations on the rescaled or quantized values; and
f) determining an output feature range of feature values of the output feature map, and determining an output feature scale of the output feature map in response to the output feature range;
wherein the initial feature map, the set of weights, the initial weight scale, the set of biases, and the maximum bias scale in steps c) through f) are the initial feature map, the set of weights, the initial weight scale, the set of biases, and the maximum bias scale corresponding to a layer being processed by a respective iteration of steps c) through f).

14. The process of claim 13, wherein the N-bit fixed point matrix operations hardware accelerator processes multiply-accumulate operations.

15. The process of claim 13, wherein the initial feature map is fixed point, and the set of weights and the set of biases are each floating point.

16. The process of claim 13, wherein the deep learning model is a convolutional neural network.

17. The process of claim 13,
further including splitting the quantized biases into paired quantized bias components prior to step f);
wherein convolving the rescaled first set of feature values with the quantized weights and the quantized biases convolves the rescaled first set of feature values with the quantized weights and the quantized paired bias components.

18. The process of claim 13, further including, in an nth iteration, for n≥2:
g) repeating steps c) through f) for a next convolution layer of the deep learning model, using the output feature map and the output feature scale as the initial feature map and initial feature scale, respectively, of the next convolution layer, until all layers of the model have been processed; and h) repeating steps c) through g), starting over at the first convolution layer of the deep learning model, using the output feature range determined in an $(n-1)^{th}$ iteration as the feedback feature range in an $n^{th}$ iteration, where $n \geq 3$.

19. The process of claim 18, further including, prior to step d), for each convolution layer of the deep learning model, determining the maximum bias scale for unsigned bias values so that maximum bias scale$\leq(2^N-1)$/maximum bias value, or for signed bias values so that $$\text{maximum bias scale} \leq \frac{2^{N-1}-1}{(\text{maximum of (absolute value of}}.$$
$$\text{maximum bias value and absolute}$$
$$\text{value of minimumm bias value)}$$

20. The process of claim 18, further including:

determining the initial feature scale for the first convolution layer for a first iteration of steps c) through f) for unsigned feature values so that $(2^P-1)$/maximum feature value, or for signed features values so that $$\text{feature scale} \leq \frac{2^{P-1}-1}{\text{maximum of (absolute value of}};$$
$$\text{maximum feature value and absolute}$$
$$\text{value of minimum feature value)}$$

and
prior to step c), for each convolution layer of the deep learning model, determining the initial weight scale for unsigned weights so that weights scale$\leq(2^Q-1)$/maximum weight $$\text{weights scale} \leq \frac{2^Q-1}{\text{maximum of (absolute value of}};$$
$$\text{maximum weight and absolute}$$
$$\text{value of minimum weight)}$$

and
wherein P is a bit depth of the feature values, Q is a bit depth of the weights, and $P+Q \leq N$.

21. The process of claim 20, further including, prior to determining the input feature scale, pruning outlier feature values.

22. The process of claim 18,
wherein the repeating of step h) is performed a number M times; and
wherein M is responsive to a stability of the updated feature scales and the updated weight scales between iterations of step h).

23. The process of claim 18, wherein the updated feature scale for the first convolution layer for an ith iteration of steps c) through g) for the first convolution layer is used as the initial feature scale for the first convolution layer for an $(i+1)^{th}$ iteration of steps c) through g).

24. The process of claim 13, wherein the externally-obtained image data includes one or more of camera pixel data, radar data, and LIDAR data.

\* \* \* \* \*